United States Patent [10] Patent No.: US 12,526,210 B2
Demchenko (45) Date of Patent: Jan. 13, 2026

(54) NETWORK INTERFACE SUPPORTING TIME SENSITIVE NETWORKS AND MACsec PROTECTION

(71) Applicant: Rambus Inc., San Jose, CA (US)

(72) Inventor: Maksym Demchenko, Eindhoven (NL)

(73) Assignee: Rambus Inc., San Jose, CA (US)

(*) Notice: Subject to any disclaimer, the term of this patent is extended or adjusted under 35 U.S.C. 154(b) by 319 days.

(21) Appl. No.: 18/039,877

(22) PCT Filed: Dec. 9, 2021

(86) PCT No.: PCT/US2021/062576
§ 371 (c)(1),
(2) Date: Jun. 1, 2023

(87) PCT Pub. No.: WO2022/125756
PCT Pub. Date: Jun. 16, 2022

(65) Prior Publication Data
US 2024/0007367 A1 Jan. 4, 2024

Related U.S. Application Data

(60) Provisional application No. 63/123,585, filed on Dec. 10, 2020.

(51) Int. Cl.
H04L 43/026 (2022.01)
H04L 9/40 (2022.01)
(Continued)

(52) U.S. Cl.
CPC .......... H04L 43/026 (2013.01); H04L 47/245 (2013.01); H04L 47/28 (2013.01); H04L 63/20 (2013.01)

(58) Field of Classification Search
CPC .... G06F 13/28; G06F 13/4068; G06F 9/4881; H04J 2203/0082; H04J 2203/0085;
(Continued)

(56) References Cited

U.S. PATENT DOCUMENTS 6,813,729 B1 * 11/2004 Tsang .................. G06F 11/2221
714/E11.163
8,635,392 B1 1/2014 Wang
(Continued)

OTHER PUBLICATIONS

Notification of Transmittal of the International Search Report and the Written Opinion of the International Searching Authority, or the Declaration with Mail Date Feb. 16, 2022 re: Int'l Appln. No. PCT/US2021/062576. 8 pages.
(Continued)

Primary Examiner — Christopher Biagini
(74) Attorney, Agent, or Firm — The Neudeck Law Firm, LLC

(57) ABSTRACT

In a general aspect, a network interface capable of processing network traffic conforming to a Time Sensitive Network (TSN) standard and a Media Access Control layer security (MACsec) standard, comprises, within an ingress path, a Physical Coding Sublayer (PCS) connected to receive a traffic stream from a network link; a Media Access Control (MAC) unit configured to split the traffic stream into a preemptable packet stream and an express packet stream; and a MACsec unit connected between the PCS and the MAC unit, configured to operate on individual fragments of a preempted MACsec protected packet in the traffic stream to produce a traffic stream with unprotected fragments for the MAC unit.

7 Claims, 3 Drawing Sheets

(51) Int. Cl.
   *H04L 47/24* (2022.01)
   *H04L 47/28* (2022.01)
(58) Field of Classification Search
   CPC .. H04J 3/1617; H04L 1/0061; H04L 12/4633;
      H04L 43/026; H04L 47/10; H04L
      47/2441; H04L 47/245; H04L 47/28;
      H04L 47/34; H04L 63/0428; H04L
      63/0485; H04L 63/061; H04L 63/08;
      H04L 63/0876; H04L 63/123; H04L
      63/162; H04L 63/20; H04L 69/22; H04L
      9/0838
   See application file for complete search history.

(56) References Cited

U.S. PATENT DOCUMENTS

| | | | | |
|---|---|---|---|---|
| 10,523,016 | B2* | 12/2019 | Hacker | H02J 4/00 |
| 2004/0001440 | A1* | 1/2004 | Kostoff, II | H04L 47/32 |
| | | | | 370/235 |
| 2010/0309932 | A1 | 12/2010 | Diab et al. | |
| 2011/0317587 | A1 | 12/2011 | Lida et al. | |
| 2013/0091349 | A1 | 4/2013 | Chopra | |
| 2013/0155929 | A1* | 6/2013 | Aboul-Magd | H04W 52/0209 |
| | | | | 370/474 |
| 2014/0198780 | A1* | 7/2014 | Qi | H04W 28/065 |
| | | | | 370/338 |
| 2019/0238441 | A1 | 8/2019 | Gotz et al. | |
| 2022/0179997 | A1* | 6/2022 | Branscomb | H04L 63/162 |

OTHER PUBLICATIONS

EP Extended European Search Report with Mail Date Sep. 25, 2024 re: EP Appln. No. 21904388.2. 11 pages.
Lackorzynski, Tim et al., "Enabling and Optimizing MACsec for Industrial Environments", IEEE Transactions on Industrial Informatics, vol. 17, No. 11, Nov. 2021, XP011868414, ISSN: 1551-3203, DOI: 10.1109/TII.2020.3040966. 8 pages.
McIntosh, James A., "MACsec-aware TSN Traffic Shapers", IEEE Draft, vol. 802, Apr. 2015, XP068096440. 12 pages.
Weis, Brian, "A Proposal for Co-existence of MACsec and Priority/Pre-emption Features", IEEE Draft, vol. 802.1, No. v00, Oct. 2014, SP068072021. 5 pages.

* cited by examiner

NETWORK INTERFACE SUPPORTING TIME SENSITIVE NETWORKS AND MACsec PROTECTION

BACKGROUND

Time Sensitive Networks, or TSNs, are in part specified by IEEE Standard 802.3br, that introduces Ethernet packet preemption. A network interface according to this standard is capable of handling two types of concurrent traffic streams, i.e. preemptable traffic and express traffic.

On the egress side, the network interface handles preemptable packets produced by the host as the normal data flow. When an express packet is produced by the host, this packet is given highest priority on the network link, whereby the preemptable packet is interrupted (preempted) so that the express packet can be sent out with the shortest possible delay. As a result, the preemptable packet ends up being transmitted in fragments interspersed with any express packets that arrive in the meantime.

Other standards applying to Ethernet traffic may coexist with TSNs, such as Media Access Control (MAC) Security, aka MACsec. MACsec protected packets are expanded with various pieces of information that may cause difficulties in streamlining the various processing stages in a network interface, especially when multiple standards are applied to the traffic.

DETAILED DESCRIPTION OF EMBODIMENTS

In a network interface supporting both Time Sensitive Networks (TSNs) and Media Access Control Security (MACsec), MACsec protection may be applied to both preemptable traffic and express traffic.

MACsec functionality is typically provided on the system side of the network interface, i.e. where the L2 Ethernet frame corresponding to the payloads of the network traffic is exchanged between the system and the network interface, because MACsec only applies to that L2 frame data, in principle. The preemptable and express traffic being conveyed in two distinct streams at that level, a straightforward design approach would be to process each stream by a respective dedicated MACsec hardware unit, or by a shared dual-port MACsec unit.

The present disclosure provides to place the MACsec functionality, in contrast, on the network link side ("line" side). Indeed, at that location a single stream conveys both express traffic and preemptable traffic, whereby a single instance of a dual-channel MACsec unit could process both types of traffic on the fly, and thus save hardware resources, for instance.

Although a similar approach was used in US patent application 2020/007652, by the same inventor, the case of a TSN-compliant network interface adds further challenges.

One apparent difficulty is that the payloads of preempted packets are fragmented and interspersed with express packets, whereas MACsec protection is typically applied on continuous payloads.

More specifically, in ingress mode, MACsec processing removes protection information, such as security tags and integrity check data, from the packets. This operation is fully innocuous when MACsec processing is performed on the system side. However, when performed on the line side, this operation results in shortening fragments of preempted packets, where the resulting shorter fragments, analogous to packets, may be rejected by the next processing stages as including frames shorter than a limit specified by the standards, typically 64 bytes for an L2 frame, including the FCS.

Figure 1:
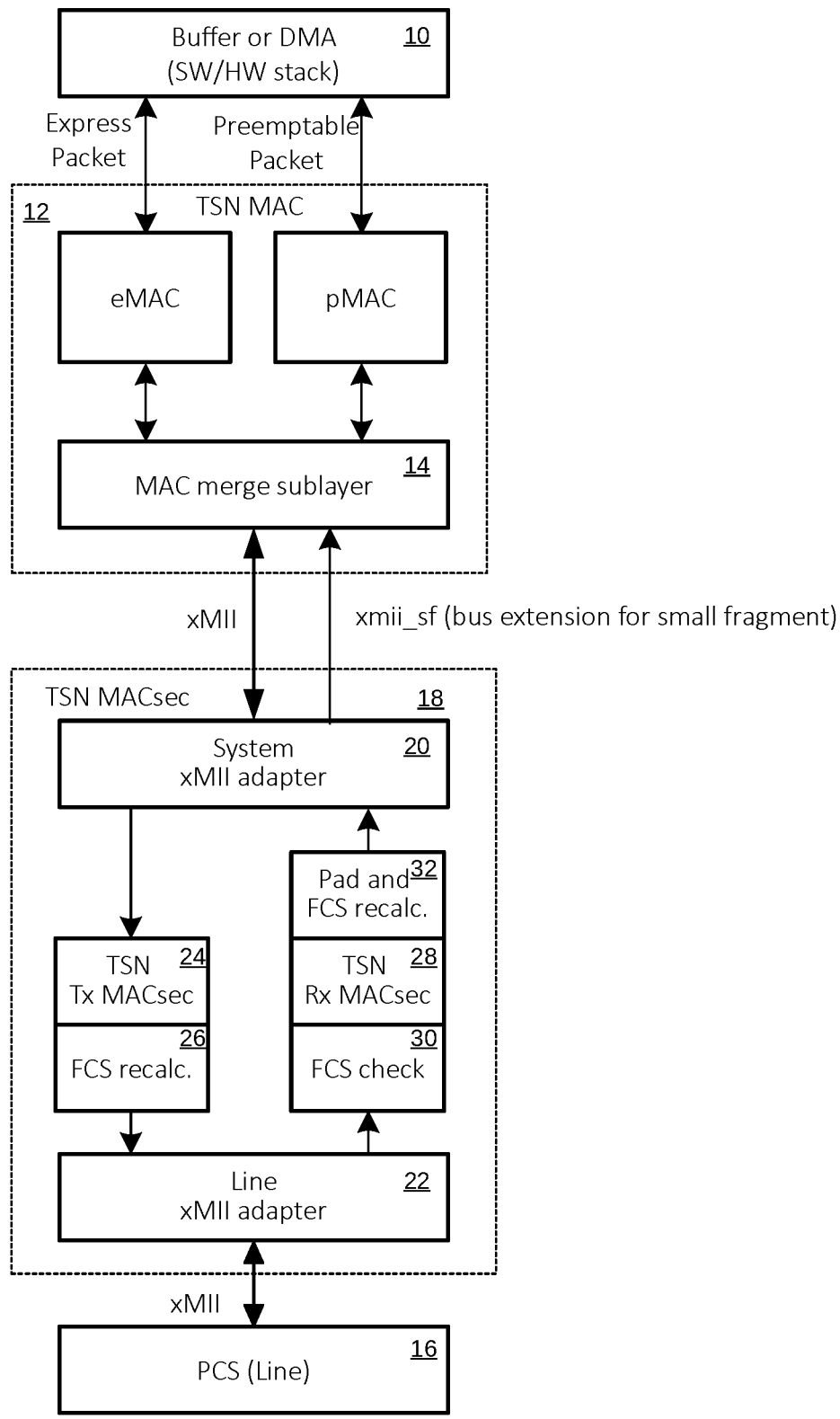
FIG. 1 is a block diagram of an embodiment of a network interface implementing TSN and MACsec protection.

FIG. 1 is a block diagram of a network interface structured according to this principle. In the following, only functionality useful for understanding the disclosed embodiments of a network interface will be explained, bearing in mind that many aspects of the operation of the network interface, that will not be addressed, follow the specifications of the involved standards.

Multiple subsystems of the interface can operate in two reciprocal modes, i.e. the ingress and egress directions. Subsystems and circuits that operate in the two modes are connected through bidirectional arrows. Subsystems and circuits that operate in only one direction are connected through unidirectional arrows.

On the system side (software/hardware stack), express and preemptable traffic is exchanged with the network interface through a buffer or DMA unit 10 coupled to a TSN-enabled Media Access Control layer 12 (TSN MAC) through two separate ports. The ports include respective dedicated MAC units, eMAC for the express traffic, and pMAC for the preemptable traffic.

A MAC merge sublayer 14 connects the eMAC and pMAC units to the line side through a bidirectional link configured to convey a single data stream in each direction, for instance a Media-Independent Interface (xMII) having a bus structure.

A conventional xMII bus is designed to communicate, in principle directly, with a physical coding sublayer (PCS) 16, connected to the physical network link or line.

In egress mode, the sublayer 14 is in charge of merging the express and preemptable packets into a single data stream on the xMII bus. The sublayer 14 also handles the preemption (when such mode is enabled) and thus fragments each preemptable packet where necessary to intersperse express packets in the single stream.

In ingress mode, the sublayer 14 is in charge of splitting the stream received from the xMII interface into the respective express and preemptable traffic channels. In particular, the multiple fragments of each preemptable packet are consolidated to form the payload of a single packet in the preemptable traffic channel.

As previously mentioned, the MACsec function is provided on the line side, in a subsystem 18, between the MAC merge sublayer 14 and the PCS 16. The subsystem 18 is "TSN aware" in that it is adapted to process a single stream conveying, over the xMII bus, preempted packet fragments interspersed with express packets.

In order to accommodate MACsec hardware on the line side without modifying its interfaces typically designed for the system side, the MACsec hardware is embedded in this embodiment between two xMII bus adapters, one adapter 20 coupled to the MAC merge sublayer 14, and the other adapter 22 coupled to the PCS.

The egress and ingress channels are shown separately within subsystem 18. The egress channel Tx includes a TSN-enabled transmission MACsec unit 24 followed by a Frame-Check Sequence (FCS) recalculation unit 26. The ingress channel Rx includes a TSN-enabled MACsec unit 28 framed between an FCS check unit 30 and an FCS recalculation and padding unit 32.

A MAC layer according to the standards, i.e. subsystem 12, is natively in charge of checking FCSs on the ingress side, and calculating and inserting FCSs on the egress side. A MACsec function will modify the payloads of the frames, by inserting or removing security tags and possibly encrypting the payloads, which is similar when MACsec functions are performed on the system side.

In the present embodiments, however, the MACsec functions are performed on the line side in subsystem 18, whereby, to avoid substantially modifying the MAC subsystem 12, subsystem 18 is configured to adjust the FCS information through units 26, 30 and 32, so that it conforms to what is expected by the MAC layer and the PCS, in ingress and egress modes, respectively.

The operation of the interface of FIG. 1 will be better understood through the following diagrams illustrating exemplary traffic through the interface.

Figure 2:
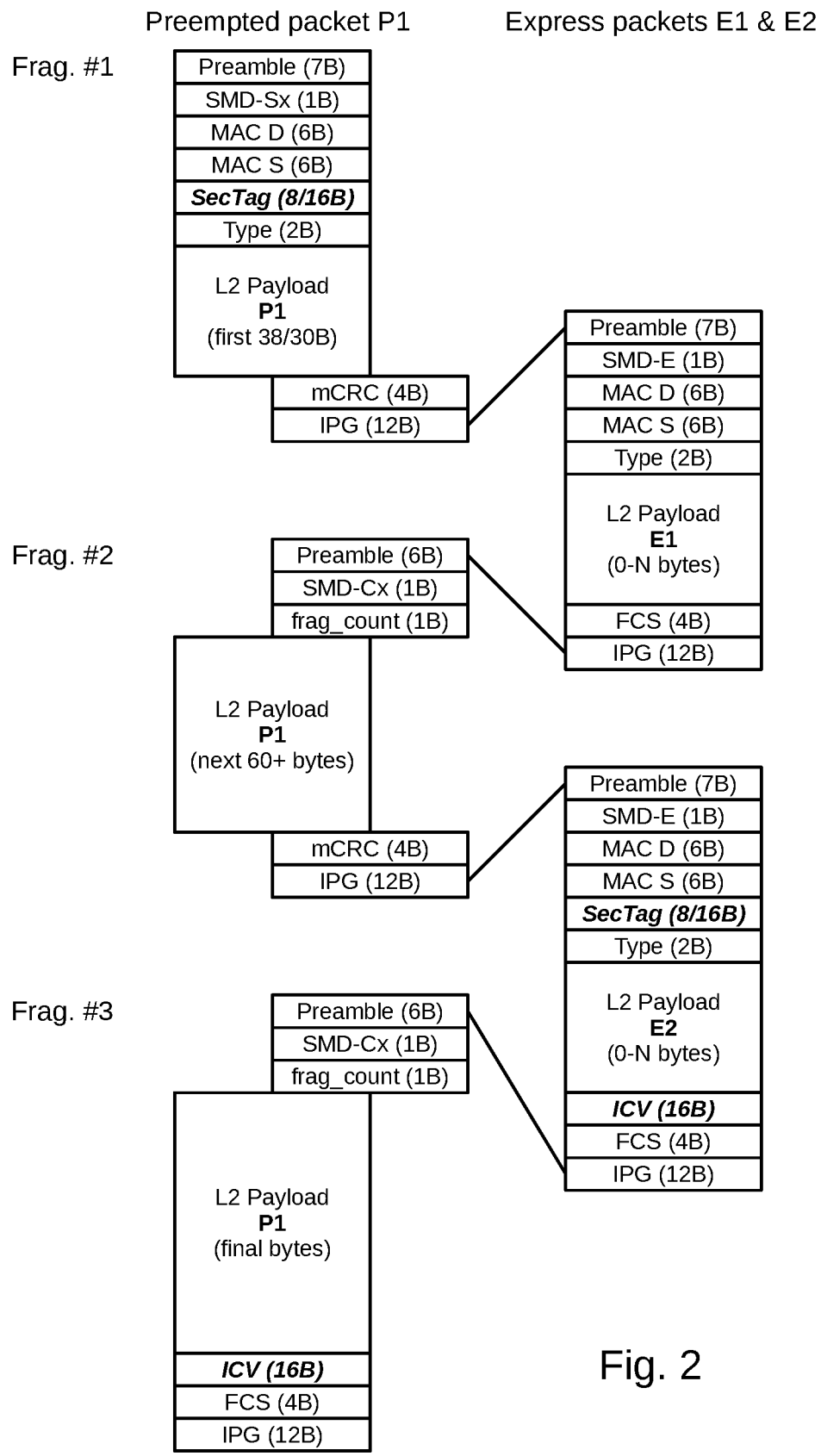
FIG. 2 is an exemplary IEEE 802.3br data stream sequence as received from a network link by the interface of FIG. 1, that includes fragments of a preempted MACsec protected packet, interspersed with two express packets.

FIG. 2 is an exemplary sequence of an ingress data stream as produced by the PCS on the xMII bus. The sequence includes fragments of a preempted MACsec protected packet P1, interspersed with two express packets E1 and E2, where packet E2 is also MACsec protected. The sequence conforms to TSN standards and may have been produced by any remote interface implementing the standards.

An Ethernet packet encapsulates a frame between an 8-byte preamble and an Inter-Packet Gap IPG that may be preceded by padding bytes. An Ethernet frame without MACsec protection may include a MAC destination address (6 bytes), followed by a MAC source address (6 bytes), a type field (2 bytes), a layer 2 (L2) payload of variable length, optional padding, and a 4-byte Frame Check Sequence (FCS). The frame padding is required when the frame is less than 64 bytes long, to extend the frame length to 64 bytes, where 64 bytes is a limit specified by the standards under which frames are rejected by downstream processing units. The FCS field is calculated over the whole frame.

In the example shown, packet P1 has been preempted according to TSN standards, and split into three fragments interspersed with the express packets E1 and E2. The fragments, analogous to packets, are also called mPackets (shorthand for "MAC Merge Packets"). For sake of clarity, the fragments of packet P1 are shown in one column on the left, and the express packets E1, E2 are shown in a separate column on the right. Overhead fields inserted by the preemption process for conforming the fragments to packets are shown offset to the right in the first column.

The start fragment and the express packets include a preamble of 7 bytes followed by a Start mPacket Delimiter (SMD). SMD-Sx denotes a delimiter identifying the Start fragment of a preempted packet, and SMD-E denotes a delimiter identifying an Express packet.

The next fragments of the preempted packet are called "continuation fragments". Their preamble is 6-bytes long, followed by an SMD-Cx byte identifying a Continuation fragment, and a frag count byte identifying the order of the continuation fragment. Continuation fragments do not include the MAC source and destination addresses, nor the type field, since these need only be present in the start fragment.

The payload of each fragment is followed by a 4-byte CRC, called mCRC, and terminated by a 12-byte IPG. The mCRC is calculated over all bytes after the first 8 bytes of the fragment. The last fragment actually conveys the original FCS, of the full preempted packet, instead of an mCRC.

The express packets actually conform to an Ethernet packet structure.

When MACsec protection is applied to the preempted packet P1, a security tag SecTag is inserted at the source system between the MAC source address and the type field, and a 16-byte Integrity Check Value (ICV) is inserted before the FCS. The SecTag may be 8 or 16 bytes long, depending on use or not of an 8-byte Secure Channel Identifier field in the packet. After fragmentation, the SecTag appears only in the start fragment, and the ICV appears only in the end fragment. The payloads in the fragments are actually consecutive chunks of the payload of the original MACsec protected packet P1.

MACsec protection of the express packet E2 involves no special aspects related to TSN functionality.

As previously mentioned, the fragments or mPackets are analogous to Ethernet packets. The fragments therefore conform to constraints set on standard packets, in particular the frame size being comprised between 64 and 1500 bytes.

At the source system, an express packet in principle preempts a preemptable packet as soon as the express packet is available, which could be just after a few bytes of the preemptable packet have been sent. However, in order to avoid fragments conveying frames smaller than 64 bytes, which would be rejected at destination, the express packet is delayed until a fragment with a 64-byte frame can be sent. Thus, as shown for the start fragment with the SecTag, the payload is at least 38 or 30 bytes long depending on the SecTag being 8 or 16 bytes long. Similarly, continuation fragments are no shorter than 64 bytes.

At a TSN-enabled destination system receiving such a data stream, the fragments of the preempted packet P1 are in principle consolidated (such as by a MAC merge sublayer 14 of FIG. 1), to form the original packet P1 prior to any further processing for higher layers (L3/L4). Such further processing could typically include MACsec processing, which, at that point, extracts the consolidated payload using the L2 headers and "unprotects" it using the SecTag and ICV. (MACsec "protection" generally offers two modes, i.e. simply signing the payloads in the ICV using cryptography, or both signing and encrypting the payloads. Hereinafter, the terminology "unprotecting" refers to the reciprocal operations of any of the two modes, i.e. simply checking the signature or checking the signature and decrypting the payload, and removing the SecTag and ICV.)

However, as provided in the embodiment of FIG. 1, MACsec processing at the destination, i.e. in ingress mode, is performed before the MAC merge sublayer 14, and hence handles each fragment individually and forwards each fragment after processing in a format expected by the MAC merge sublayer. An intermediate result of "unprotecting" the fragment is stored in the TSN MACsec unit 28 to be resumed in the next fragment such that processing of the whole preempted packet conforms to MACsec standards.

Figure 3:
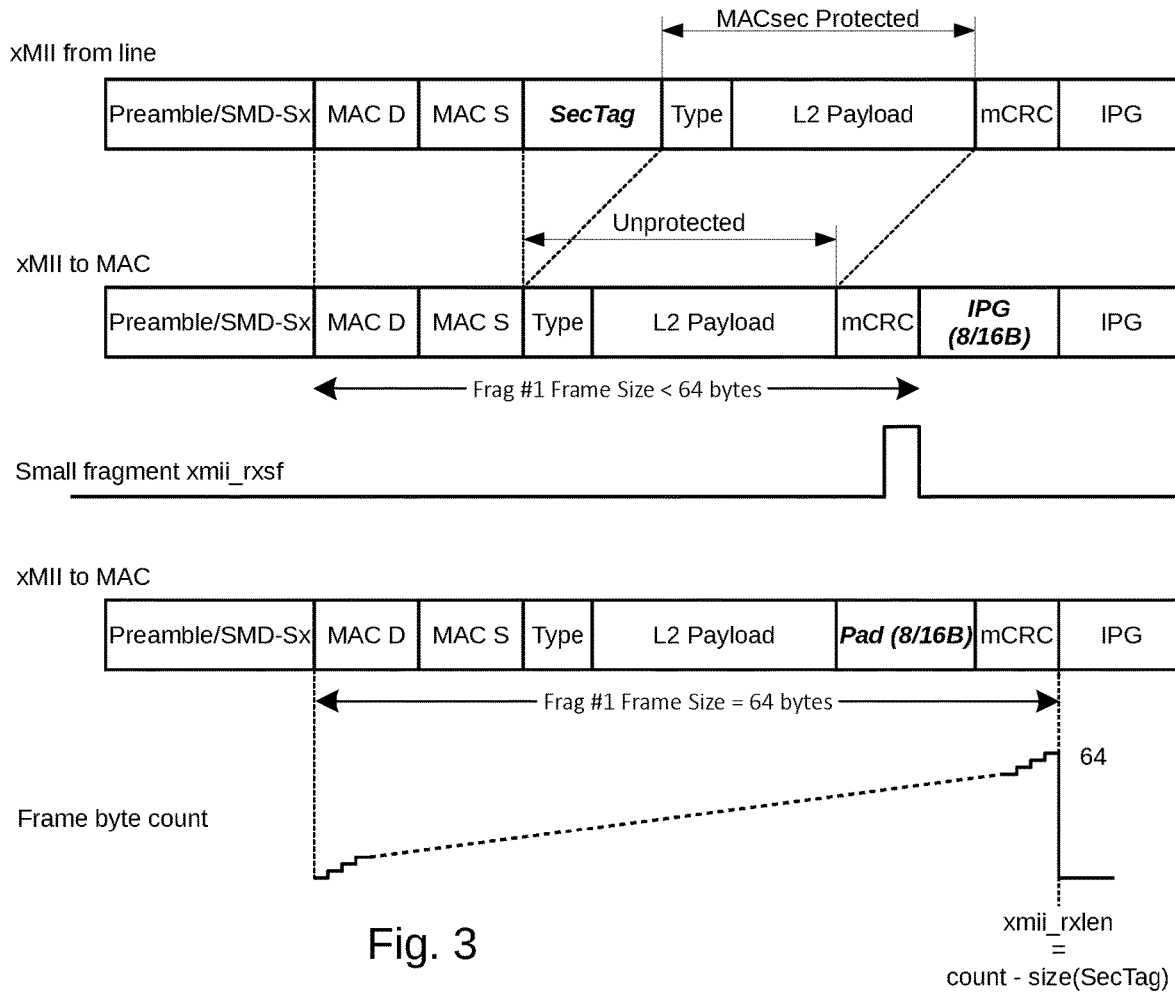
FIG. 3 is a time diagram showing alternative methods that may be implemented by the interface of FIG. 1 for processing fragments of a preempted MACsec protected incoming packet.

FIG. 3 is a set of time diagrams illustrating exemplary methods of processing the start fragment of FIG. 2 in the TSN MACsec subsystem 18.

The top diagram illustrates the start fragment of FIG. 2 as it arrives at subsystem 18 on the xMII bus from the PCS 16.

The Rx MACsec unit 28 is "TSN-enabled", hence configured to expect and process fragments of a preempted packet instead of a full packet. The unit 28 thus reads and removes the SecTag and starts calculating the ICV signature and possibly decrypting the payload (and type field) on the fly. In the meantime, the unit 30 checks the consistency of the mCRC value of the fragment.

The second diagram illustrates the stream as produced by the MACsec unit 28 on the xMII bus for the MAC subsystem 12, especially the MAC merge sublayer 14. The resulting unprotected frame has been shortened by 8 or 16 bytes, corresponding to the size of the SecTag, and is thus shorter in this example than the minimum frame length of 64 bytes. If no measure is taken, the frame will be rejected by the MAC subsystem. This situation arises more generally when the frame of the start fragment has a size comprised between 64 and 64+size(SecTag).

For purposes of comparison, the two streams have been shown aligned from the beginning of the fragments. In practice, the second stream is delayed by at least the SecTag length so that the MACsec unit can immediately fill the gap left by the SecTag with the subsequent payload.

In a first embodiment, the xMII bus on the MAC subsystem side is complemented by a small fragment signal line xmii_rxsf that is enabled each time the removal of the SecTag causes the frame size to drop below 64 bytes. The line xmii_rxsf may be enabled as soon as the condition is detected, typically at the end of the frame when the mCRC is checked, as shown.

The end of packet is first detected by the PCS, which then enables an end-of-packet signal on the xMII bus. Since the PCS does not actually check the mCRC, this task is delegated to unit 30 of the TSN MACsec subsystem, emulating MAC merge functionality. The unit 30 also calculates the fragment's contribution to the full FCS, emulating the MAC. The MACsec unit 28 removes the SecTag after processing the payload and subsequently the unit 32 recalculates the mCRC and the contribution to the full FCS of the shortened and unprotected frame.

The end-of-packet signal produced by the PCS may be used to check the small fragment condition by MACsec unit 28, for example by comparing the count reached by a frame byte counter to a threshold corresponding to the small frame limit, i.e. the small fragment signal xmii_rxsf is enabled when the count reached is less than the smallest fragment size.

In turn, the MAC subsystem 12 is configured to respond to the small fragment signal xmii_rxsf by exceptionally accepting the fragment although it is too small.

This breach of the standards has no impact on the global functionality, since the breach affects only a transitory fragment that is designed to be consolidated with other fragments to form a proper, standard compliant packet.

The unit 32 is also configured to insert padding in the stream after the mCRC, as shown in the second diagram, to compensate for the removal of the SecTag and maintain minimum fragment size on the xMII bus. Such padding is also used when unprotecting small express packets, and the last fragment if it happens to become small after removal of the ICV.

In a second embodiment, as shown in the third diagram, the SecTag is again removed, but the compensation padding is inserted between the payload and the mCRC. In this manner the fragment size, which now also includes the padding, is not altered and remains, in appearance, acceptable for the next processing stages, i.e. the MAC subsystem 12 will not reject such a fragment.

In some circumstances, inserting padding at the end of a (full) packet at the source is standard practice, and such padding is handled at destination through dedicated headers within the payload that identify the effective payload size. However, inserting padding in a fragment at destination cannot be handled in a standard manner in subsequent stages. Indeed, when consolidating the fragments, the resulting payload will have padding bytes in the middle instead of at the end, and no header can be set or modified to indicate this particular padding condition.

To overcome this issue, the xMII bus on the MAC subsystem side is complemented by a fragment length indicator xmii_rxlen, for instance coded over 6 bits. This fragment length may be produced from a counter started at the beginning of the frame of each start fragment (first byte of MAC destination address) and stopped at the end of the mCRC of the original fragment, as detected by the PCS.

An exemplary evolution of the counter is illustrated at the bottom of FIG. 3. In the example, illustrating a minimum size frame of 64 bytes, the counter reaches 64. The actual value of the fragment length indicator would be xmii_rxlen=count−size(SecTag).

The MAC subsystem is then configured to respond to the fragment length indicator xmii_rxlen, when it is smaller than 60=64-4 (small frame limit minus mCRC length), by discarding the bytes in the fragment beyond the position identified by xmii_rxlen, up to the mCRC, in effect discarding the padding bytes.

As regards the continuation fragments, including the last fragment of the preempted packet, no small fragment issue arises, in principle. Indeed, the intermediate continuation fragments convey no MACsec tags to be removed and MACsec decryption preserves the payload size.

The last continuation fragment conveys the MACsec ICV, which is removed. Unit 32 is configured to add padding to the fragment to ensure a minimum frame size of 64 bytes when removal of the 16-byte ICV causes the frame to become too small. Padding added at this stage, in fact at the end of the original payload, is equivalent to padding inserted at the source, and is thus processed transparently by the MAC layer.

The ICV is checked by TSN MACsec unit 28. For this purpose, unit 28 calculates the ICV value through each fragment, saving intermediate values from one fragment to the next, until the calculation is finalized for comparison in the last fragment.

Since the express packets E1 and E2 follow standard packet structures, the MACsec processing of express packet E2 is standard, and is carried out by MACsec unit 28 on the fly as the express packet E2 is received.

Thus, the single MACsec unit 28 processes both preemptable packets and express packets on the fly at ingress.

On the egress side, the MACsec unit 24 will also operate on a single stream conveying fragments of preempted packets, interspersed with express packets, as produced by the MAC merge sublayer 14. Such processing also involves some difficulties, such as maintaining the fragment sizes to not delay the express packet traffic, while inserting MACsec information.

In particular, a SecTag is to be inserted in the start fragment of a preempted packet. In order to not change the fragment size, a trailing portion of the fragment's payload, of the size of the SecTag (8 or 16 bytes), is removed from the fragment and inserted at the beginning of the payload of the next fragment. Thus, a trailing portion of the payload of each fragment, of the size of the SecTag, is shifted to the beginning of the payload of the next fragment. The last fragment also receives the ICV, and is thus increased by 24 to 32 bytes, corresponding to the SecTag size and the ICV. The size of the last fragment can be increased without penalty, because no express packets remain to be processed thereafter.

Thus, the single MACsec unit 24 processes both preemptable packets and express packets on the fly at egress.

Figure 4:
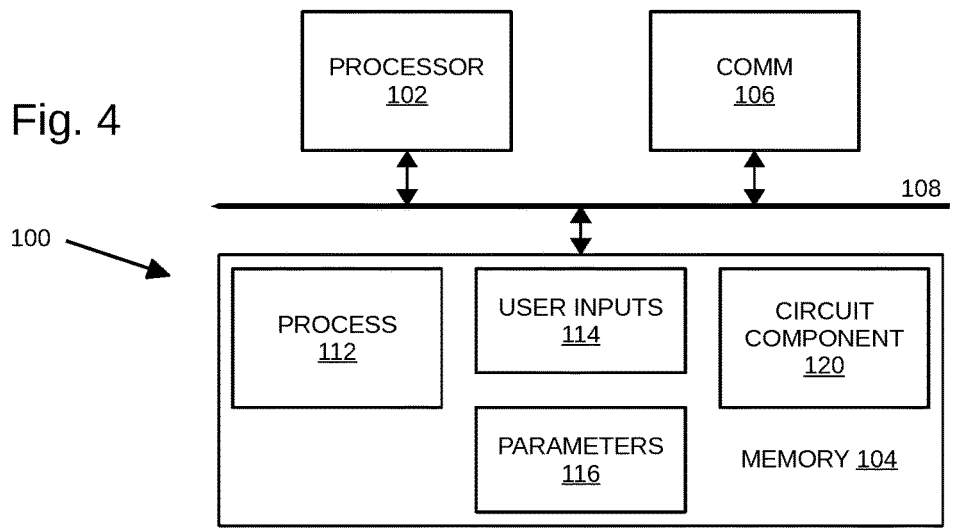
FIG. 4 is a block diagram illustrating an embodiment of a processing system for processing or generating a representation of a network interface.

FIG. 4 is a block diagram illustrating one embodiment of a processing system 100 for processing or generating a representation of a circuit component 120. Processing system 100 includes a processor 102, a memory 104, and one or more communications devices 106. Processor 102, memory 104, and communications devices 106 communicate using any suitable type, number, and/or configuration of wired and/or wireless connections 108.

Processor 102 executes instructions of one or more processes 112 stored in a memory 104 to process and/or generate circuit component 120 responsive to user inputs 114 and parameters 116. Processes 112 may be any suitable electronic design automation (EDA) tool or portion thereof used to design, simulate, analyze, and/or verify electronic circuitry and/or generate photomasks for electronic circuitry. Representation 120 includes data that describes all or portions of the network interface as shown in FIG. 1.

Memory 104 includes any suitable type, number, and/or configuration of non-transitory computer-readable storage media that stores processes 112, user inputs 114, parameters 116, and circuit component 120.

Communications devices 106 include any suitable type, number, and/or configuration of wired and/or wireless devices that transmit information from processing system 100 to another processing or storage system (not shown) and/or receive information from another processing or storage system (not shown). For example, communications devices 106 may transmit circuit component 120 to another system. Communications devices 106 may receive processes 112, user inputs 114, parameters 116, and/or circuit component 120 and cause processes 112, user inputs 114, parameters 106, and/or circuit component 120 to be stored in memory 104.

What is claimed is:

1. A hardware network interface capable of processing network traffic conforming to a Time Sensitive Network (TSN) standard and a Media Access Control layer security (MACsec) standard, comprising, within an ingress path:
   a Physical Coding Sublayer (PCS) connected to receive a traffic stream from a network link;
   a Media Access Control (MAC) controller including a selector that splits the traffic stream into a preemptable packet stream and an express packet stream; and
   a MACsec processing pipeline between the PCS and the MAC controller along the ingress path, the MACsec processing pipeline to remove security tags from individual starting fragments of a preempted MACsec protected packets in the traffic stream to produce a traffic stream with unprotected fragments for the MAC unit, the MACsec processing pipeline to communicate, to the MAC controller, a small fragment signal based on sizes of corresponding unprotected fragments meeting a threshold, the MAC controller to accept corresponding unprotected fragments that meet the threshold based on the small fragment signal.

2. The network interface of claim 1, wherein the MACsec processing pipeline is to insert trailing padding into start fragments of the size of the security tags, and to produce corresponding effective fragment length counts for the MAC controller; and the MAC controller is to remove the trailing padding from the modified start fragments based on the corresponding effective fragment length counts.

3. The network interface of claim 1, wherein the MACsec processing pipeline further comprises:
   a line a Media-Independent Interface (xMII) adapter coupled with the PCS; and
   an system xMII adapter coupled with the MAC controller.

4. A method for processing incoming network traffic according to a Time Sensitive Network (TSN) standard and a Media Access Control layer security (MACsec) standard, the incoming network traffic including at least one express packet interspersed with a plurality of fragments of a preempted MACsec protected packet, comprising:
   receiving the incoming network traffic and processing the plurality of fragments by using protection information conveyed in the preempted MACsec protected packet, thereby producing a modified traffic stream conveying fragments of a preempted unprotected packet, the plurality of fragments including a starting fragment;
   removing a security tag from the starting fragment to produce a shortened start fragment that, based on the removal of the security tag, meets a size threshold;
   based on the shortened start fragment meeting the size threshold, signaling, in association with communicating the shortened start fragment, that the shortened start fragment that met the size threshold should be accepted as one of the plurality of fragments communicated as part of the modified stream; and
   receiving the modified stream and splitting the modified stream into a preemptable packet stream in which the plurality of fragments are consolidated, and an express packet stream.

5. The method of claim 4, further comprising:
   modifying the preempted MACsec protected packet by inserting trailing padding of the size of the security tag;
   producing an effective fragment length count for the starting fragment; and
   upon receiving the modified stream, responding to the effective fragment length count by removing the padding from the shortened start fragment.

6. The method of claim 4, further comprising:
   receiving the incoming network stream in a Media-Independent Interface (xMII) format, and converting it to an intermediate format suitable for processing the protection information; and
   converting the modified stream from the intermediate format back to the xMII format.

7. A method for processing network traffic according to a Time Sensitive Network (TSN) standard and a Media Access Control layer security (MACsec) standard, comprising:
   receiving a preemptable packet stream and a concurrent express packet stream via a single stream having at least one express packet interspersed with a plurality of fragments of a preempted packet, the plurality of fragments including a starting fragment having a size that, when a security tag is removed from the starting fragment to create a shortened starting fragment, meets a threshold;
   based on the shortened starting fragment meeting the threshold, communicating, concurrently with communicating the shortened starting fragment and via a signal line not used to communicate the shortened starting fragment, a small fragment indicator; and based on receiving the small fragment indicator, processing the shortened starting fragment for consolidation with others of the plurality of fragment to regenerate the preempted packet.

\* \* \* \* \*